(12) United States Patent  
Yonemoto et al.

(10) Patent No.: US 7,981,500 B2
(45) Date of Patent: Jul. 19, 2011

(54) CARBON FIBER REINFORCED PREPREG OF GAS BARRIER PROPERTIES, CARBON FIBER REINFORCED PLASTIC AND METHODS OF PRODUCING THE SAME

(75) Inventors: Koichi Yonemoto, Fukuoka (JP); Takeo Ebina, Miyagi (JP); Fujio Mizukami, Miyagi (JP); Keiichi Okuyama, Okayama (JP); Shoji Kamiya, Hyogo (JP)

(73) Assignees: Kyushu Institute of Technology, Fukuoka (JP); National Institute of Advanced Industrial Science and Technology, Tokyo (JP); Institute of National Colleges of Technology, Japan, Tokyo (JP); Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 12/741,553

(22) PCT Filed: Oct. 27, 2008

(86) PCT No.: PCT/JP2008/069459
§ 371 (c)(1),
(2), (4) Date: Jul. 13, 2010

(87) PCT Pub. No.: WO2009/060747
PCT Pub. Date: May 14, 2009

(65) Prior Publication Data
US 2010/0304145 A1    Dec. 2, 2010

(30) Foreign Application Priority Data
Nov. 10, 2007 (JP) .................................. 2007-292659

(51) Int. Cl.
B32B 27/04 (2006.01)

(52) U.S. Cl. ................ 428/297.4; 264/257; 156/185; 156/245

(58) Field of Classification Search ............... 428/297.4, 428/301.4, 300.7, 408; 156/185, 245; 264/257; 220/581, 660
See application file for complete search history.

(56) References Cited

U.S. PATENT DOCUMENTS

| | | | | |
|---|---|---|---|---|
| 5,394,603 | A * | 3/1995 | Reil et al. | 29/463 |
| 6,617,020 | B2 * | 9/2003 | Zhou et al. | 428/355 R |
| 7,412,956 | B2 * | 8/2008 | Gotou et al. | 123/193.2 |
| 2006/0163752 | A1 * | 7/2006 | Wang et al. | 257/794 |
| 2010/0096595 | A1 * | 4/2010 | Prud'Homme et al. | 252/500 |
| 2010/0304145 | A1 * | 12/2010 | Yonemoto et al. | 428/408 |
| 2011/0052476 | A1 * | 3/2011 | Prud'Homme et al. | 423/415.1 |

FOREIGN PATENT DOCUMENTS

JP 62-151337 A 7/1987
(Continued)

*Primary Examiner* — N. Edwards
(74) *Attorney, Agent, or Firm* — Sughrue Mion, PLLC

(57) ABSTRACT

There are provided a carbon fiber reinforced prepreg of gas barrier properties comprising a sheet-like carbon fiber reinforcement and a matrix resin including therein a gas barrier layer having a clay mineral with a plate-like crystal structure unidirectionally aligned and densely laminated, and a carbon fiber reinforced plastic produced from the carbon fiber reinforced prepreg. Such prepreg is obtained by disposing a film material of gas barrier properties having a clay mineral with a plate-like crystal structure unidirectionally aligned and densely laminated, in at least one interlayer of a laminate of a carbon fiber reinforced prepreg comprising a sheet form carbon fiber reinforcement and a matrix resin; and then heating and/or pressurizing the laminate. The carbon fiber-reinforced composite material of the invention exhibits high gas barrier properties, and particularly hydrogen gas barrier properties.

14 Claims, 1 Drawing Sheet

FOREIGN PATENT DOCUMENTS

| | | |
|---|---|---|
| JP | 09-280496 A | 10/1997 |
| JP | 2002-104297 A | 4/2002 |
| JP | 2005-126651 A | 5/2005 |
| JP | 2005-264052 A | 9/2005 |
| JP | 2006-188645 A | 7/2006 |
| JP | 2007-277078 A | 10/2007 |

* cited by examiner

[Fig 1]
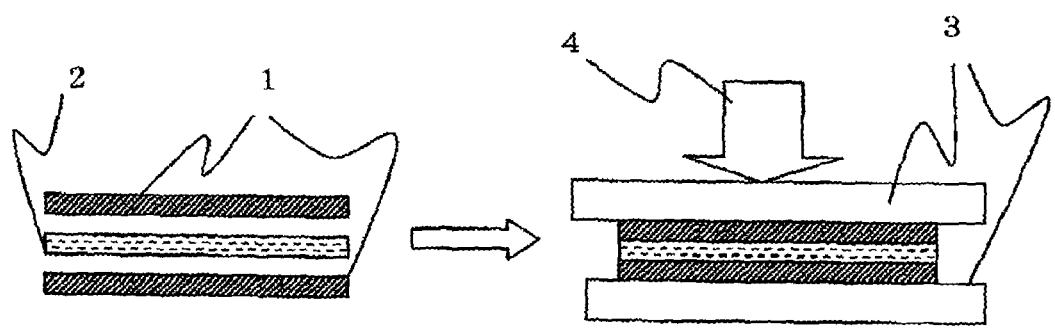

CARBON FIBER REINFORCED PREPREG OF GAS BARRIER PROPERTIES, CARBON FIBER REINFORCED PLASTIC AND METHODS OF PRODUCING THE SAME

TECHNICAL FIELD

The present invention relates to a carbon fiber reinforced prepreg, of gas barrier properties, particularly, of excellent hydrogen gas barrier properties, and a carbon fiber reinforced plastic, and methods of producing them or methods of molding them.

BACKGROUND ART

Fiber reinforced plastics (FRP) are composite materials including thermosetting resins such as unsaturated polyester resins, epoxy resins and polyimide resins, matrix resins of thermoplastic resins such as polyethylenes, polypropylenes, polyamides, polysulfones, polyethersulfones and polyether ether ketones, and fiber reinforcements such as carbon fibers, glass fibers and aramid fibers. These composite materials are molded, for example, from a prepreg, which is an intermediate product, produced by impregnating a reinforced fiber with a matrix resin through molding and processing steps including heating and pressurizing. In particular, composite materials using a carbon fiber as a reinforced fiber have been recently frequently used as members of aircraft, automobiles, etc. due to their lightness and excellent mechanical characteristics such as high strength.

Incidentally, in a situation in which the age of making use of hydrogen, a clean fuel instead of a hydrocarbon fuel, so-called a hydrogen energy society is coming, it is expected that lightening of the storage container of hydrogen is further demanded in consideration of easiness of handling. Further, for that purpose, it is considered that use of carbon fiber reinforced plastics is effective that are more excellent in specific strength than metal materials such as stainless steel and aluminum conventionally having been used. However, it is almost impossible to use the carbon fiber reinforced plastic fabricated in a conventional manner simply as a vessel for hydrogen since organic plastics are generally low in barrier properties, particularly have properties of easily passing hydrogen gas therethrough.

Hence, when a carbon fiber reinforced plastic is utilized, gas barrier properties, particularly hydrogen gas barrier properties should be imparted to the fiber by some methods. Conventionally, when carbon fiber reinforced plastics are used, for example, as a structural material for hydrogen tanks, a liner comprising a aluminum plate is affixed to a plastic, or an aluminum foil is affixed thereto to thereby have imparted hydrogen gas barrier properties thereto in many cases. However, these methods pose the problems of a bonded surface being peeled due to difference of the thermal expansion coefficient, etc., whereby practical applications are prevented. Instead of such methods, although the surface of a hydrogen tank is attempted to be covered with an organic film, this method decreases the hydrogen permeability to some extent, but sufficient hydrogen gas barrier properties for practical applications are not always obtained so far (e.g., Patent Document 1).

Patent Document 1: Japanese Unexamined Patent Application Publication No. 2005-126651

On the other hand, recently, a gas barrier material of thermal resistance that is made of a clay mineral has been developed (see Patent Document 2). This material is a clay mineral such as silicate having a lamellar crystal structure, highly oriented in one direction, and is processed such that dense layers are bonded to each other with a small amount of an organic binder to be, for example, a flexible film having heat resistance and high gas barrier properties alone. Up to now, lamellar silicate (clay) served as a filler has been used in an additive form to improve the gas barrier performance of FRP. In addition, although its effect was identified to some extent, the amount of addition was limited since the moldability of the plastic itself is worsened. It is considered that the technology of Patent Document 2 is an epoch-making technology which finds that a film extremely improved in heat resistance and gas barrier properties is obtained when a clay mineral conventionally used as a filler is utilized as a film.

Patent Document 2: Japanese Unexamined Patent Application Publication No. 2006-188645

The present inventors have diligently studied to aim to develop a composite material having high gas barrier properties, particularly hydrogen gas barrier properties, conventionally not obtained, by organically binding the technology of Patent Document 2 above to the technology of the carbon fiber reinforced plastic, having led to the present invention.

DISCLOSURE OF THE INVENTION

Problems to be Solved by the Invention

The inventive subject is to provide a carbon fiber-reinforced composite material that has a high gas barrier property, particularly a hydrogen gas barrier property.

Means for Solving the Problems

The invention described in claim 1 of the present invention is a carbon fiber reinforced prepreg including a sheet form carbon fiber reinforcement and a matrix resin of gas barrier properties, comprising therein a gas barrier layer having a clay mineral having a plate-like crystal structure unidirectionally aligned and densely laminated.

A carbon fiber reinforced prepreg in the present invention stands for a sheet-like molded intermediate made by impregnating a carbon fiber reinforcement with a resin and adjusting its flowability and adhesiveness to improve the handleability.

The invention described in claim 3 is a method of producing a carbon fiber reinforced prepreg of gas barrier properties includes: disposing a film material of gas barrier properties having a clay mineral with a plate-like crystal structure unidirectionally aligned and densely laminated, in at least one interlayer of a laminate of a carbon fiber reinforced prepreg comprising a sheet form carbon fiber reinforcement and a matrix resin; and then heating and/or pressurizing the laminate.

The invention described in claim 5 is a method of producing a carbon fiber reinforced prepreg of a gas barrier property includes: applying or impregnating a dispersion liquid of a clay mineral to or into the surface of a carbon fiber reinforced prepreg comprising a sheet form carbon fiber reinforcement and a matrix resin, forming a gas barrier layer having a clay mineral with a plate-like crystal structure unidirectionally aligned and densely laminated, on the prepreg surface; and then heating and/or pressurizing the prepreg formed with the gas barrier layer; or further disposing a matrix resin layer or the above carbon fiber reinforced prepreg on the surface of the gas barrier layer to make a laminate; and then heating and/or pressurizing the laminate.

The invention described in claim 7 is a carbon fiber reinforced plastic including a carbon fiber reinforcement and a matrix resin of gas barrier properties, comprising therein a gas barrier layer having a clay mineral with a plate-like crystal structure unidirectionally aligned and densely laminated.

A carbon fiber reinforced plastic in the present invention refers to a molded product (finished product or parts) obtained by forming by a variety of molding methods using a carbon fiber reinforcement and a matrix resin.

The invention described in claim 9 is a method of producing a carbon fiber reinforced plastic of gas barrier properties includes: disposing a film material of gas barrier properties having a clay mineral with a plate-like crystal structure unidirectionally aligned and densely laminated, in at least one interlayer of a laminate of a carbon fiber reinforced prepreg comprising a carbon fiber reinforcement laid in a forming die and a matrix resin; and then mold-clamping the forming die and heating and/or pressurizing for forming.

The invention described in claim 11 is a method of producing a carbon fiber reinforced plastic of gas barrier properties, including: disposing a film material of gas barrier properties having a clay mineral with a plate-like crystal structure unidirectionally aligned and densely laminated, in at least one interlayer of a laminate of a sheet form carbon fiber reinforcement laid in a forming die; and then molding by resin transfer molding or resin film infusion.

The invention described in claim 13 is a method of producing a carbon fiber reinforced plastic of gas barrier properties, includes: disposing, in a layer on the way of winding, a film material of gas barrier properties having a clay mineral with a plate-like crystal structure unidirectionally aligned and densely laminated, in winding and laminating on a mandrel a composite material comprising a carbon fiber reinforcement and a matrix resin by filament winding molding method; and then heating and curing the matrix resin.

Any inventions above preferably use 3 to 30% by mass, more preferably 4 to 20% by mass of an organic additive as a binder together with a clay mineral, based on the amount of the clay mineral. The organic additive is not particularly limited and a substance containing a component that is the same as or similar to the component of the matrix resin is appropriately used.

EFFECTS OF THE INVENTION

According to the present invention, a carbon fiber-reinforced composite material (including an intermediate) exhibiting high gas barrier properties not obtained conventionally, particularly hydrogen gas barrier properties. In addition, such composite material can be utilized for container material of hydrogen tanks, hydrogen storage facilities and the like, for lightening in place of metal material such as stainless steel and aluminum.

BRIEF DESCRIPTION OF THE DRAWINGS

FIG. 1 is a drawing indicating a method of laminating a carbon fiber reinforced prepreg and a clay membrane (film material of gas barrier properties) and curing the laminate at high temperature by hot press. In FIG. 1, reference numeral 1 indicates a carbon fiber reinforced prepreg, reference numeral 2 indicates a clay membrane, and reference numeral 3 indicates a forming die, and reference numeral 4 indicates hot press.

DESCRIPTION OF THE PREFERRED EMBODIMENTS

Although a "gas barrier layer or film material having a clay mineral with a plate-like crystal structure unidirectionally aligned and densely laminated" is disclosed in Patent Document 2, its manufacturing method and the characteristics will be described below.

The gas barrier layer or film material of gas barrier properties of the present invention includes a clay layer as a main constituent and its basic structure is configured to comprise natural or synthetic expansive clay having a layer thickness of about 1 nm, a particle diameter of about 1 μm and an aspect ratio of about 300, or about 70% by mass or more of organized clay made by subjecting expansive clay to organic modification and about 30% by mass or less of natural or synthetic low molecular/high molecular organic additive with a molecular size of several nm or less. Herein, organic modification stands for silylation treatment or organic ion-exchange treatment and in the invention material made by such treatment is included in the clay mineral.

This clay layer is produced by repeatedly and densely laminating lamellar crystals oriented in the same direction. The resulting clay layer has a clay layer thickness of 3 to 100 μm; its gas barrier performance exhibits an oxygen permeability of 0.1 $cc/m^2/24$ hr/atm or less and a hydrogen permeability of 0.1 $cc/m^2/24$ hr/atm or less in terms of 30 μm clay layer thickness; its area can be made 100×40 cm or more; and the direct current resistance to the clay layer in the vertical direction is 1 mega $\Omega$ or more.

The clay or clay minerals include minerals such as mica, vermiculite, smectite, and talc; of them, smectite characteristically has excellent film producibility, swelling properties, easy dispersibility in water, and readily gels gelates water. Smectites are naturally included in a mineral that is called bentonite in an amount of about 30 to 70% by mass. A synthetic smectite is also produced. Smectites include, in addition to montmorillonite, minerals such as iron montmorillonite, beidellite, saponite, hectorite, stevensite, and nontronite, which have similar crystal structures and characteristics. The present invention can use the above clay or clay minerals, preferably either natural smectites or syntheric smectites, or organized clay or mixtures thereof. Clay or a clay mineral is added to a solvent to prepare a dilute, uniform dispersion liquid. The concentration of the dispersion liquid is preferably 0.5 to 15% by mass, more preferably 1 to 10% by mass.

Next, a solid or liquid organic additive is added to the clay dispersion liquid to prepare a uniform dispersion liquid. The organic additive is not particularly limited so long as it improves the flexibility of a sticky clay film and is uniformly mixed with clay, and the examples that can be used include low molecular weight compounds such as ethylene glycol, glycerin and Epsilon-caprolactam, natural products such as dextrine, starch, gelatin, agar, flour and gluten, thermosetting and thermoplastic resins that are used a matrix resin described below. In particular, alkyd resins, polyurethane resins, epoxy resins, fluorocarbon resins, acrylic resins, methacryl resins, phenol resins, polyamide resins, polyester resins, polyimide resins, polyvinyl resins and silicone resins are preferred. The ratio of addition of the organic additive is 3 to 30% by mass, preferably 4 to 20% by mass, based on the clay mineral. In the order of mixing of the clay dispersion liquid and the organic additive, clay can be added to a solvent and then an organic additive is added thereto, and vice versa. Moreover, a clay dispersion liquid and an organic additive solution can be separately prepared and then both can be mixed together.

A method of producing a clay layer includes, for example, slowly evaporating a liquid serving as a dispersion liquid on a substrate to form a film shape. The drying is carried out, for example, in a forced blowing oven at a temperature of 30 to 100° C., preferably 30 to 50° C., for 10 min to a half day, preferably 10 min to 5 hr, to obtain a clay layer.

Next, when the clay layer is obtained as a film material, the clay layer obtained in the above manner is peeled from the substrate. Thus, a film material that can be used as a free standing film is obtained.

In the present invention, a sheet form carbon fiber reinforcement means a planar form such as a woven and knitted fabric of a carbon fiber, a multi-axial woven fabric, and a unidirectionally arranged sheet-like material of a strand. It may be carbon fiber paper made by using a chopped strand. In addition, a multi-axial woven fabric generally stands for a fabric made by piercing a laminate (multi-axial woven fabric substrate) produced by laminating bundles of fiber reinforcements aligned in one direction in a sheet form at different angles with a stitch thread such as a nylon yarn, polyester yarn, and glass-fiber yarn in the thickness direction and then reciprocatively stitching them along the surface direction between the surface and the back of the laminate.

The thermosetting matrix resin of the matrix resins of the present invention is not particularly limited and specifical examples can include epoxy resins, unsaturated polyester resins, phenol resins, vinyl ester resins, cyanate ester resins, urethane acrylate resins, phenoxy resins, alkyd resins, urethane resins, precured resins of maleimide resins and cyanate resins, bismaleimide resins, polyimide resins and polyisoimide resins having an acetylene terminus, polyimide resins having a nasic acid terminus, and the like. These can be used as a mixture of one or two or more kinds. Of these, epoxy resins and vinyl ester resins excellent in thermal resistance, elastic modulus, and chemical resistance are particularly preferred. These thermosetting resins may include colorants and various additives typically used, and the like, in addition to curing agents and curing accelerators.

Additionally, the thermoplastic resins of matrix resins used in the present invention include, for example, one kind or two or more kinds of resins selected from the group consisting of polypropylene, polysulfone, polyethersulfone, polyether ketone, polyether ether ketone, aromatic polyamide, aromatic polyester, aromatic polycarbonate, the polyphenylene sulfide polyetherimide, polyarylene oxide, thermoplastic polyimide, polyamide-imide, polybutylene terephthalate, polyethylene terephthalate, polyethylene naphthalate, polyethylene, acrylonitrile butadiene styrene, and polylactic acid. Moreover, they can also be partially used by mixing with thermosetting resins. Of these, polyamide resins and acrylonitrile butadiene styrene (ABS) resins excellent in thermal resistance, elastic modulus and chemical resistance are particularly preferred. These thermoplastic resins may include colorants and various additives typically used, and the like.

The method of producing a prepreg of the present invention is not particularly limited, and the examples that can be adopted include well-known methods, for example, a method of impregnating a sheet form carbon fiber reinforcement with a melt thermoplastic resin (melt infiltration method), a method of coating and fusing a powdered thermoplastic resin by a fluid bed method or a suspension method, and a method of impregnating a fiber reinforcement with a thermoplastic resin solution and then removing the solvent. Preferably included are melt infiltration methods and particularly a method of feeding an overlapped material of a film-like resin and fiber reinforcement, continuously melting the resin between belts with heating and pressurizing and also impregnating a reinforced fiber therewith. These thermoplastic resins are used within the range of 10 to 90% by mass, preferably 20 to 60% by mass as the content of the resin in the prepreg.

The carbon fiber reinforced prepreg of gas barrier properties of the present invention is preferably produced by the following method.

A first method includes placing a film material of gas barrier properties having a plate-like crystal structure unidirectionally aligned and densely laminated, obtained in the above manner, in at least one interlayer of the laminate of a carbon fiber reinforced prepreg made of a sheet form carbon fiber reinforcement and a matrix resin obtained in the above manner and then heating and/or pressurizing this laminate.

The method/process of heating and/or pressurization includes a method that comprises, for example, sandwiching the laminate with steel belts, passing the laminate together with the steel belts through a heated roll for heating and pressurization, or intermittently pressing the laminate to thereby soften or melt the matrix resin for integration. Alternatively, the methods include a method of continuously heating and cooling the laminate by a belt press, or a method of preheating the laminate by a far-infrared ray heater and then cold-pressing, or a batch method of using a heating and cooling press. The heating temperature is preferably the softening point or melting point or more of the matrix resin; the pressure is preferably about 0.1 to 10 MPa.

A second method includes applying or impregnating a dispersion liquid of a clay mineral to or into the surface of a carbon fiber reinforced prepreg comprising a sheet form carbon fiber reinforcement and a matrix resin, forming a gas barrier layer having a clay mineral with a plate-like crystal structure containing a silicate salt as a main component unidirectionally aligned and densely laminated, on the prepreg surface; and then heating and/or pressurizing the prepreg formed with the gas barrier layer; or further disposing a matrix resin layer or the carbon fiber reinforced prepreg on the surface of the gas barrier layer to make a laminate; and then heating and/or pressurizing the laminate. In such method, the dispersion liquid of the clay mineral is preferably applied to or impregnated into the surface of the prepreg in a state in which the resin component in the prepreg is not completely solidified to form the gas barrier layer. For example, for the method of impregnating a fiber reinforcement with a solution for a matrix resin, if a dispersion liquid of a clay mineral is applied to or impregnated into the fiber reinforcement surface prior to the complete removal of the solvent while the resin keeps flowability, the prepreg is tightly bonded to the gas barrier layer.

One other aspect of the present invention is a carbon fiber reinforced plastic including a carbon fiber reinforcement and a matrix resin of gas barrier properties, i.e., a molded product (including parts), comprising therein a gas barrier layer with a clay mineral having a plate-like crystal structure unidirectionally aligned and densely laminated. The following method is preferred to form such molded product.

For instance, such molded product of the carbon fiber reinforced plastic (including parts) is obtained by laminating/placing on a forming die one or a plurality of sheet-like carbon fiber reinforced prepreg of the invention as obtained by the above described method, and then mold-clamping the forming die and heating and/or pressurizing it. Specifically, a molded product of a carbon fiber reinforced plastic is obtained by molding the plastic by die pressing, autoclave forming, heating/cold pressing or the like. In this case, a fiber reinforcement, resin or a film material of gas barrier properties comprising clay mineral can also be optionally additionally laminated to adjust the fiber volume fraction (Vf), resin content, or gas barrier performance, in the molded product. The content of the resin in the molded product is typically 10 to 90% by mass, preferably 30 to 70% by mass.

The lamination conditions of the sheet-like carbon fiber reinforced prepreg of the present invention can be properly set on the basis of the demand in the structure of an aimed molded product. For example, when the molded product is a thin cylinder like a tank, a large stress is generated in the circumferential direction. In this case, the fiber direction of prepreg is primarily in the circumferential direction to be able to withstand this stress. Moreover, in the case where the main stress direction in the molded product cannot be decided, or the stress is substantially uniform, for example, the lamination direction of the prepreg is set at 0°/45°/90°/45°/0° so that the strength and elastic coefficient may have isotropic values. The molding equipment is not particularly limited, and for example, a hot press or autoclave can be used.

Alternatively, the molded product of the above carbon fiber reinforced plastic can be produced by the method below without making the prepreg having a gas barrier layer of the present invention as an intermediate.

A carbon fiber reinforced plastic of gas barrier properties is obtained by disposing a film material of gas barrier properties having a clay mineral with a plate-like crystal structure unidirectionally aligned and densely laminated, for example, in at least one interlayer of a laminate of a carbon fiber reinforced prepreg comprising a carbon fiber reinforcement and a matrix resin laid in a forming die and then then mold-clamping the forming die and heating and/or pressurizing (invention of claim 9). The kind of the forming die and way of heating and pressurization are not limited at all, and for example, the hot press molding method, the autoclave molding method, and the vacuum bag molding method can be used.

In addition, a carbon fiber reinforced plastic of gas barrier properties is obtained by disposing a film material of gas barrier properties having a clay mineral with a plate-like crystal structure unidirectionally aligned and densely laminated, in at least one interlayer of a laminate of a sheet form carbon fiber reinforcement laid in a forming die; and then molding by resin transfer molding or resin film infusion (invention of claim 11).

Some molded products of fiber reinforced plastics using a fiber reinforcement processed to a sheet shape are molded by resin transfer molding (RTM technique) or resin film infusion (RFI method). In the RTM technique, a molded product of a fiber reinforced plastic is obtained by laying a fiber reinforcement in a mold, injecting a resin into the cavity of the mold to impregnate the fiber reinforcement with the resin and curing it. On the other hand, in the RFI method, a molded product is obtained by laying a resin film together with a fiber reinforcement in a mold, impregnating the fiber reinforcement with the resin by heating, and then curing it.

Additionally, in the filament winding molding method, a carbon fiber reinforced plastic of gas barrier properties is obtained by disposing, in a layer on the way of winding, a film material of gas barrier properties having a clay mineral with a plate-like crystal structure unidirectionally aligned and densely laminated, in winding and laminating on a mandrel a composite material comprising a carbon fiber reinforcement and a matrix resin; and then heating and curing the matrix resin (invention of claim 13).

The filament winding molding method is also a well-known forming method, and is a forming method that involves winding a fiber reinforcement (filament, roving, and tape-shaped material) impregnated with a matrix resin on a rotating mandrel and making it at a predetermined thickness, and then curing and demolding. Filament winding molding method can mold tanks and hoses.

Hereinafter, the present invention will be described specifically by way of example.

EXAMPLE 1

(1) Production of Clay Membrane S

Two g of natural montmorillonite (Kunipia P, available from KUNIMINE INDUSTRIES CO., LTD.) added as clay with 60 cc of distilled water was placed in a plastic hermetically sealed vessel together with a Teflon (registered trademark of Du Pont Corp.) rotator and the material was vigorously agitated to obtain a uniform dispersion liquid. Next, this clay dispersion liquid was deaerated by a vacuum deaerator. This dispersion liquid was applied onto a brass plate with a length of about 30 cm and a width of 20 cm at a thickness of 2 mm, and this was left to stand horizontally and dried for 30 min at a temperature of 60° C. in a forced blowing oven to obtain a clay layer with a thickness of about 40 μm, which was peeled from the brass plate to obtain a clay free standing film. Thereafter, the film was heat-treated for 30 min at 110° C. in a blowing constant temperature thermostat to obtain a clay film (clay film S).

(2) Production of Clay Film H 2.7 g of natural montmorillonite (Kunipia P, available from KUNIMINE INDUSTRIES CO., LTD.) and 0.72 g of synthetic mica (Somasif ME-100, available from CO-op Chemical Co., Ltd.) added as clay with 100 cc of distilled water was placed in a plastic hermetically sealed vessel together with a Teflon (registered trademark of Du Pont Corp.) rotator and the material was vigorously agitated at 25° C. for two hr to obtain a uniform dispersion liquid. To this dispersion liquid was added 0.18 g of Epsilon-caprolactam as an organic additive and the material was further agitated to obtain a clay dispersion liquid. This was gradually dried to obtain clay paste.

Next, this clay paste was deaerated by a vacuum deaerator. Further, this clay paste was applied to a brass tray. A stainless steel scraper was used for the application. A spacer was utilized as a guide to mold a uniform thickness clay paste film. Here, the thickness of the paste was set at 2 mm. This tray was dried at a temperature of 60° C. for one hr in a forced blowing oven to thereby obtain a uniform organic additive composite clay film having a thickness of about 40 μm. The generated clay film was peeled from the tray to obtain an independent, excellently flexible clay film (clay film H).

(3) Production of Carbon Fiber Reinforced Prepreg of the Invention

As shown in FIG. 1, the clay film S or H obtained above was sandwiched between carbon fiber reinforced prepregs and laminated, and a method of curing it at a high temperature by a hot press was attempted. PYROFIL #380 (product name) available from Mitsubishi Rayon Co., Ltd. was used as a carbon fiber reinforced prepreg (prepreg of an ordinary temperature type obtained by impregnating a cloth of an elastic modulus of 24 ton by use of a PAN based carbon fiber with a resin having as a main component a bisphenol A type liquid epoxy resin).

Three strips made by cutting the prepreg into a size of 150×100 mm were laminated and one of the above clay films S or H having the same size was laid on top of it and further three prepregs with the same size were laminated. The resulting laminate was pressurized at 130° C. for 90 min at about 900 Kgf by a hot press (USA hot press, model number

PE1645) to obtain a molded body for testing (a rate of temperature rise of 3° C./min).

(4) Measurement of Hydrogen Permeability of Test Specimen

A disk with a radius of 29 mm was cut out of the molded body obtained above. Then, an end was cut so that the length in one direction was 55 mm to fabricate a test piece. The thickness of the test piece was almost 1.1 to 1.2 mm. The transmittance of hydrogen gas was determined for the test piece thus obtained using a normal temperature gas permeation test equipment (Test piece was measured for an area of 1,521 mm$^2$ at a valve-inlet pressure of 93 to 209 kPa, at a valve-outlet pressure of a vacuum, and at a temperature of 23.8 to 24.6° C.)

As a result, the hydrogen permeability of the test specimen when clay film S was used was $0.0078\times10^{-16}$ mol·m/m$^2$·s·Pa (the thickness of the test specimen was 1.176 mm); the hydrogen permeability of the test specimen when the clay film H was used was $0.0035\times10^{-16}$ mol·m/m$^2$·s·Pa (the thickness of the test specimen was 1.174 mm). Hence, the carbon fiber reinforced prepreg of gas barrier properties of the invention was decreased in a hydrogen permeability of 2 to 3 digits and exhibits extremely high hydrogen gas barrier properties, as compared with the prepregs of Comparative Examples described below.

(5) COMPARATIVE EXAMPLE (WELL-KNOWN EXAMPLE)

The hydrogen permeabilities of the fiberglass-reinforced plastic and the carbon fiber reinforced plastic that are typical composite materials are about 0.5 to $5\times10^{-16}$ mol·m/m$^2$·s·Pa. The hydrogen permeabilities are large, i.e., hydrogen gas barrier properties are almost absent, so that the plastics cannot be used directly as the structural material for hydrogen tanks.

Thus far, if carbon fiber reinforced plastics are used as a structural material for hydrogen tanks, a liner comprising a aluminum plate is affixed to a plastic, or an aluminum foil is affixed thereto to thereby have imparted hydrogen gas barrier properties thereto. Specifically, in experiments of the present inventor, when an aluminum foil of 25 μm is affixed to a fiberglass-reinforced plastic, it has been shown that the hydrogen permeability was decreased to about 0.0002 to $0.01\times10^{-16}$ mol·m/m$^2$·s·Pa.

However, in the present situation, the application of an aluminum foil to carbon fiber reinforced plastics, etc. prevents practical uses, partly because the bonded surface of the plastic and the aluminum foil is peeled due to its thermal expansion coefficient difference. In addition to the use of aluminum material like this, it is also considered that the surface of a hydrogen tank is covered with an organic film. Although this method decreases the hydrogen permeability, hydrogen gas barrier properties sufficient to practical applications are not obtained.

EXAMPLE 2

In this Example, the production of a cylindrical clay film will be described.

(1) Production of Clay Paste 30.4 g of natural montmorillonite (Kunipia P, available from KUNIMINE INDUSTRIES CO., LTD.) as clay and 8.1 g of synthetic mica (Somasif ME-100, available from CO-op Chemical Co., Ltd.) added with 859.5 cc of distilled water was placed in a plastic hermetically sealed vessel together with a Teflon (registered trademark of Du Pont Corp.) rotator and the material was vigorously agitated at 25° C. for two hr to obtain a uniform dispersion liquid. To this dispersion liquid was added 2.0 g of Epsilon-caprolactam as an organic additive and the resulting material was further agitated to obtain 4.5% by mass in solid component of a clay dispersion liquid. This was gradually dried to produce a clay paste with a solid component of 9% by mass.

(2) Production of Cylindrical Clay Film

Teflon (registered trademark of Du Pont Corp.) fine plates with a width of 10 mm and a thickness of 2 mm were placed in two sites (an interval of about 110 mm) in a ring form on the inner wall of a metal pail can for a film production area. The metal pail can was rotated at a speed of 20 rpm, and the clay paste was applied to the film production area. In the application, a uniform clay film with a thickness of 2 mm was molded by means of a stainless steel scraper using a Teflon ring as a guide. After molding, the metal pail can was directly placed in a forced blowing oven and dried for 10 hr or more at a temperature of 60° C. In addition, a 20 L can with an inside dimension φ 285×330 mm (JIS·Z1620) was used as the metal pail can.

Thereafter, the Teflon ring in the metal pail can was detached, the clay film was peeled, and an independent cylindrical clay film was obtained. The resulting cylindrical clay film had a about φ 280×110 mm and an average thickness of 0.223 mm (R=0.192 to 0.253). This cylindrical clay film can be suitably used for a method of producing carbon fiber reinforced plastics of gas barrier properties by the filament winding molding method of the present invention.

INDUSTRIAL APPLICABILITY

The fields of utilization of carbon fiber reinforced plastics having hydrogen gas barrier performance extends over various industrial fields, and their targets are vessel materials such as hydrogen tanks or hydrogen storage facilities for lightening in place of metal materials such as stainless steel and aluminum.

The invention claimed is:

1. A carbon fiber reinforced prepreg including a sheet form carbon fiber reinforcement and a matrix resin of gas barrier properties, comprising therein a gas barrier layer having a clay mineral with a plate-like crystal structure unidirectionally aligned and densely laminated.

2. The carbon fiber reinforced prepreg of gas barrier properties according to claim 1, wherein the gas barrier layer includes 3 to 30% by mass of an organic additive based on the amount of the clay mineral.

3. A method of producing a carbon fiber reinforced prepreg of gas barrier properties comprising:
   disposing a film material of gas barrier properties having a clay mineral with a plate-like crystal structure unidirectionally aligned and densely laminated, in at least one interlayer of a laminate of a carbon fiber reinforced prepreg comprising a sheet form carbon fiber reinforcement and a matrix resin; and then
   heating and/or pressurizing the laminate.

4. The method of producing a carbon fiber reinforced prepreg of gas barrier properties according to claim 3, wherein the film material of gas barrier properties includes 3 to 30% by mass of an organic additive based on the amount of the clay mineral.

5. A method of producing a carbon fiber reinforced prepreg of gas barrier properties comprising:

applying or impregnating a dispersion liquid of a clay mineral to or into the surface of a carbon fiber reinforced prepreg comprising a sheet form carbon fiber reinforcement and a matrix resin, forming a gas barrier layer having a clay mineral with a plate-like crystal structure unidirectionally aligned and densely laminated, on the prepreg surface;

heating and/or pressurizing the prepreg formed with the gas barrier layer; or further disposing a matrix resin layer or the carbon fiber reinforced prepreg on the surface of the gas barrier layer to make a laminate; and then heating and/or pressurizing the laminate.

6. The method of producing the carbon fiber reinforced prepreg of gas barrier properties according to claim 5, wherein the dispersion liquid of the clay mineral includes 3 to 30% by mass of an organic additive based on the amount of the clay mineral.

7. A carbon fiber reinforced plastic including a carbon fiber reinforcement and a matrix resin of gas barrier properties, comprising therein a gas barrier layer having a clay mineral with a plate-like crystal structure unidirectionally aligned and densely laminated.

8. The carbon fiber reinforced plastic of gas barrier properties according to claim 7, wherein the gas barrier layer includes 3 to 30% by mass of an organic additive based on the amount of the clay mineral.

9. A method of producing a carbon fiber reinforced plastic of gas barrier properties comprising:

disposing a film material of gas barrier properties having a clay mineral with a plate-like crystal structure unidirectionally aligned and densely laminated, in at least one interlayer of a laminate of a carbon fiber reinforced prepreg comprising a carbon fiber reinforcement laid in a forming die and a matrix resin; and then mold-clamping the forming die and heating and/or pressurizing for forming.

10. The method of producing a carbon fiber reinforced prepreg of gas barrier properties according to claim 9, wherein the film material of gas barrier properties includes 3 to 30% by mass of an organic additive based on the amount of the clay mineral.

11. A method of producing a carbon fiber reinforced plastic of gas barrier properties, comprising:

disposing a film material of gas barrier properties having a clay mineral with a plate-like crystal structure unidirectionally aligned and densely laminated, in at least one interlayer of a laminate of a sheet form carbon fiber reinforcement laid in a forming die; and then molding by resin transfer molding or resin film infusion.

12. The method of producing a carbon fiber reinforced plastic of gas barrier properties according to claim 11, wherein the film material of gas barrier properties includes 3 to 30% by mass of an organic additive based on the amount of the clay mineral.

13. A method of producing a carbon fiber reinforced plastic of gas barrier properties, comprising:

disposing, in a layer on the way of winding, a film material of gas barrier properties having a clay mineral with a plate-like crystal structure unidirectionally aligned and densely laminated, in winding and laminating on a mandrel a composite material comprising a carbon fiber reinforcement and a matrix resin by filament winding molding method; and then heating and curing the matrix resin.

14. The method of producing a carbon fiber reinforced plastic of gas barrier properties according to claim 13, wherein the film material of gas barrier properties includes 3 to 30% by mass of an organic additive based on the amount of the clay mineral.

* * * * *